United States Patent
Weiss

[19]

[11] Patent Number: 5,947,855
[45] Date of Patent: Sep. 7, 1999

[54] VEHICLE HYBRID WHEEL DRIVE SYSTEM

[75] Inventor: Heinz Weiss, Bensheim, Germany

[73] Assignee: Deere & Company, Moline, Ill.

[21] Appl. No.: 08/870,846

[22] Filed: Jun. 6, 1997

[30] Foreign Application Priority Data

Jun. 14, 1996 [DE] Germany .............. 196 23 738

[51] Int. Cl.[6] .................................................. B60K 41/28
[52] U.S. Cl. .................... 475/5; 477/3; 180/65.2
[58] Field of Search ................ 475/5; 477/3, 7; 180/65.2, 65.6, 60

[56] References Cited

U.S. PATENT DOCUMENTS

| | | |
|---|---|---|
| 1,951,089 | 3/1934 | Fielder . |
| 3,799,284 | 3/1974 | Hender ................................ 477/3 X |
| 4,319,140 | 3/1982 | Paschke . |
| 4,423,794 | 1/1984 | Beck ................................... 477/3 X |
| 4,953,646 | 9/1990 | Kim . |
| 4,985,845 | 1/1991 | Gotz et al. . |
| 5,067,932 | 11/1991 | Edwards . |
| 5,120,282 | 6/1992 | Fjallstrom ......................... 180/65.4 |
| 5,168,946 | 12/1992 | Dorgan ................................ 475/5 X |
| 5,195,600 | 3/1993 | Dorgan ............................ 180/65.2 X |
| 5,301,769 | 4/1994 | Weiss . |
| 5,409,425 | 4/1995 | Shibahata ............................ 475/5 |
| 5,419,406 | 5/1995 | Kawamoto et al. ............ 475/5 X |
| 5,448,561 | 9/1995 | Kaiser et al. . |
| 5,575,737 | 11/1996 | Weiss . |

FOREIGN PATENT DOCUMENTS 41 08 647 C2  9/1992  Germany .
44 31 929 C1  10/1995  Germany .

OTHER PUBLICATIONS

ATZ Automobiltechnische Zeitschrift 81 (1979) 6, Seite 288, Bild 6.
U. S. Application Serial No. 08/870,846 (08711–US).

Primary Examiner—Dirk Wright
Assistant Examiner—Peter T. Kwon

[57] ABSTRACT

A vehicle drive system includes a generator driven by an internal combustion engine and a drive axle having a pair of wheels, each wheel being driven by an associated electric motor powered by the generator. The engine also drives a drive shaft which is coupled to the drive axle. The drive system also includes a pair of summing gears, each having an output shaft coupled to a respective wheel, and each summing gear having a first input coupled to the drive shaft and a second input coupled to the respective electric motor.

5 Claims, 3 Drawing Sheets

VEHICLE HYBRID WHEEL DRIVE SYSTEM

BACKGROUND OF THE INVENTION

This invention relates to a vehicle drive system for vehicles, such as for an agricultural or industrial tractor, wherein the drive system includes a drive axle with two wheels, each wheel being driven by a respective electric motor powered by an engine-driven generator.

Such electric individual wheel drive systems are known from DE-A 4 108 647 and U.S Pat. No. 4,953,646. Such drive systems permit individual matching of the drive power to the different driving requirements. Thus, stepless adjustment of the wheel speed in the forward and reverse directions is possible using a suitable controller for the electric motors. Furthermore, driving the wheels at different speeds and individually matched torques is advantageous when travelling around a curve, since it is possible to avoid deformation of the vehicle, to reduce tire wear and attain improved tracking. However, because of the conversion of the whole of the mechanical energy into electrical energy and back into mechanical energy, the efficiency of the known drive systems is not satisfactory for all applications.

Vehicle drives are also known (B. R. Hohn & B. Pinnekamp: "Der autarke Hybrid—Ein universelles Antriebskonzept fur Pkw", ATZ Automobtechtlische Zeitschrift 96(1994), page 294), in which the wheels of an axle are driven in common. In a first drive concept (serial hybrid), the drive to the axle is always provided by a single electric motor, which is powered by an engine driven and generator unit or alternatively by a vehicle battery. There is no purely mechanical coupling between the engine and the axle. According to a second drive concept (parallel hybrid), the axle is driven alternatively by the engine (and a mechanical transmission) or the electric motor, which draws its energy from the vehicle battery. Such drive systems can suit private cars but they do not solve the problems which occur with commercial vehicles relating to efficiency, driving behavior and provision of the required energy.

SUMMARY OF THE INVENTION

Accordingly, an object of this invention is to provide a drive system which facilitates good overall efficiency, stepless matching of the speeds of rotation and/or torques of the individual wheels to the desired driving requirements and improvement of the driving behavior of the vehicle.

This and other objects are achieved by the present invention, wherein a drive axle has a pair of wheels, each coupled to an output of a respective summing gear. An input of each summing gear is coupled to an engine driven drive shaft. The other input of each summing gear is coupled to a respective electric motor, and each motor is powered by an engine driven generator. Thus, each wheel is driven by the combination in the summing gear of the mechanical power from the drive shaft and the power from the electric motor. A final drive speed reduction gearbox in the form of a planetary gear may be coupled between the summing gear and the wheel. This final drive gearbox has a high speed reduction ratio in order to match the relatively high drive speeds of the internal combustion engine and the electric motor to the wheel speeds of the commercial vehicle. An axle with such hybrid driven wheels comprises a hybrid axle. The vehicle may be provided with a further axle with wheels which are purely electrically driven through a speed reduction gear, such as a planetary gear.

Such a hybrid axle may be used as the drive axle of an implement trailing a vehicle, wherein the mechanical power may be supplied by a PTO shaft of the vehicle to the trailed implement, and wherein the electrical energy provided by the generator is fed through cables and connectors to the electric motors of the drive axle of the trailed implement. Either the vehicle, the trailed implement, or both may have at least one such hybrid axle. Furthermore, the trailed implement may be provided with electrical individual wheel drives.

Preferrably, a change-speed gearbox is coupled between the engine and the summing gear and can be shifted between at least two transmission ratios. Also, the engine preferrably directly and mechanically drives a front PTO shaft and/or a rear PTO shaft. This saves frequent energy conversion from mechanical into electrical and back again into mechanical energy, which could result in a reduction in the efficiency. The change-speed gearbox for the PTO shaft drive may also serve for the hybrid drive, thus eliminating transmission components. To this end a change-speed gearbox which can be shifted between at least two different transmission ratios can be integrated into the drive axle and be driven by the drive shaft. Such a gearbox output may be selectively coupled to the summing gears of the individual wheel drives of the drive axle and/or a PTO shaft.

DETAILED DESCRIPTION

Figure 1:
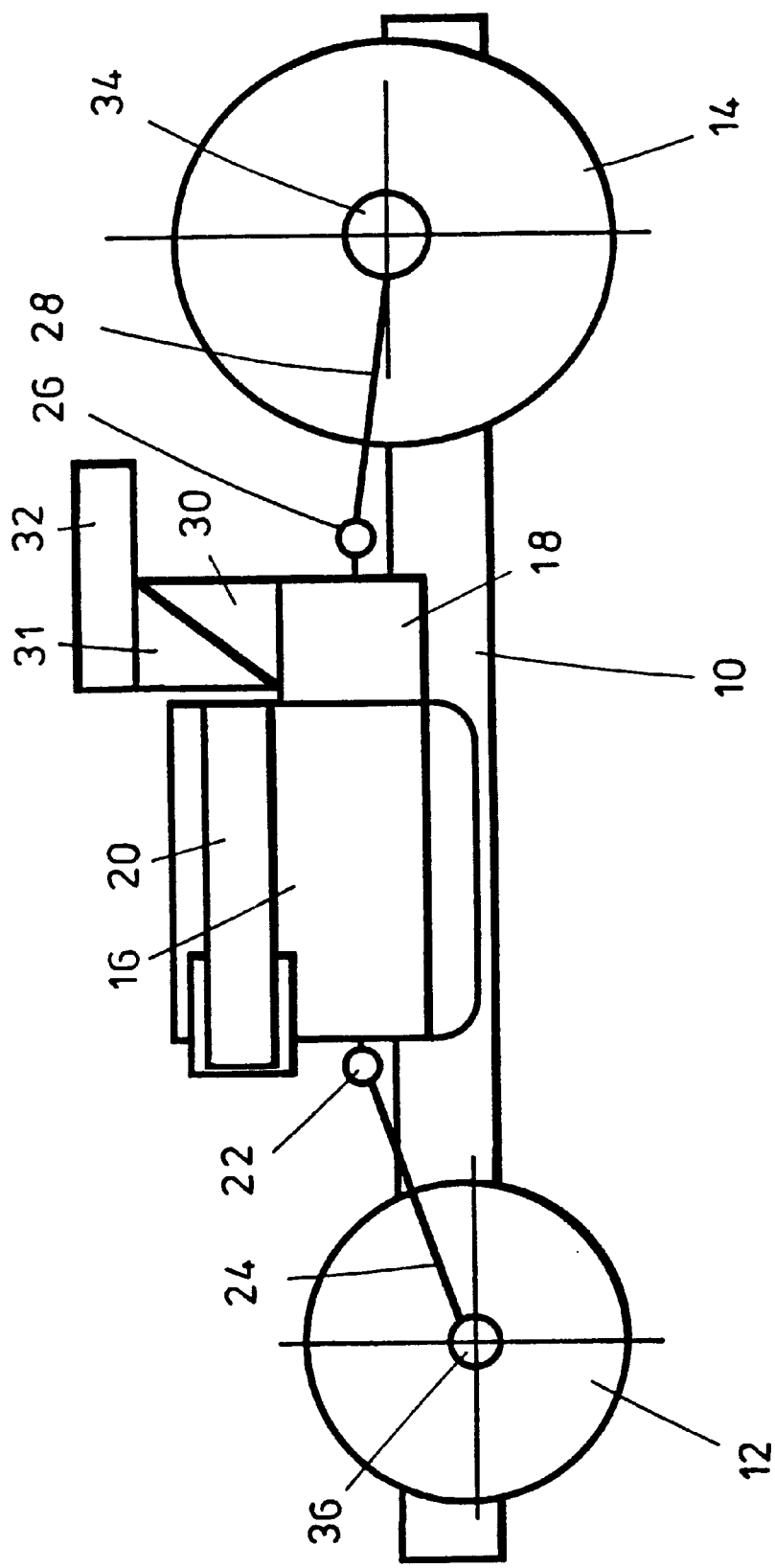
FIG. 1 is a schematic diagram of an agricultural tractor.

Referring to FIG. 1, the vehicle comprises a vehicle frame 10, as is described in EP-A 0 075 484 or as known from John Deere tractors of the 6000 series. The vehicle frame 10 is carried on steering front wheels 12 and non-steering rear wheels 14. An internal combustion engine 16 and a three-phase generator 18 driven by the internal combustion engine 16 are mounted on the vehicle frame 10. The internal combustion engine 16 is supplied by a mechanically or electronically controlled fuel injection unit 20.

The internal combustion engine 16 drives a front drive shaft 24 through at least one first universal joint 22 and a rear drive shaft 28 through at least one second universal joint 26. Gear components and/or clutches (not shown) can be arranged in between the internal combustion engine 16 and the drive shafts 24, 26. The front drive shaft 24 drives a front PTO shaft (not shown), if desired through a PTO shaft change-speed gearbox (not shown) and a PTO shaft clutch. The rear drive shaft 28 is coupled to a change-speed gearbox of the rear axle 34, as will be explained in more detail with reference to FIG. 3, and supplies the mechanical drive for the hybrid drive of the rear axle 34 and for the rear PTO shaft.

The front axle 36 carries two steered front wheels 12, which are each driven by an associated electric motor 44, such as are known from DE-A 4 108 647. The output power of the three-phase generator 18 is converted to direct current by a rectifier 30 and distributed to the electric motors of the individual wheel drives by means of inverters 31 associated with each electric motor and an electronic control device 32. The motors are preferably low cost asynchronous motors.

Figure 2:
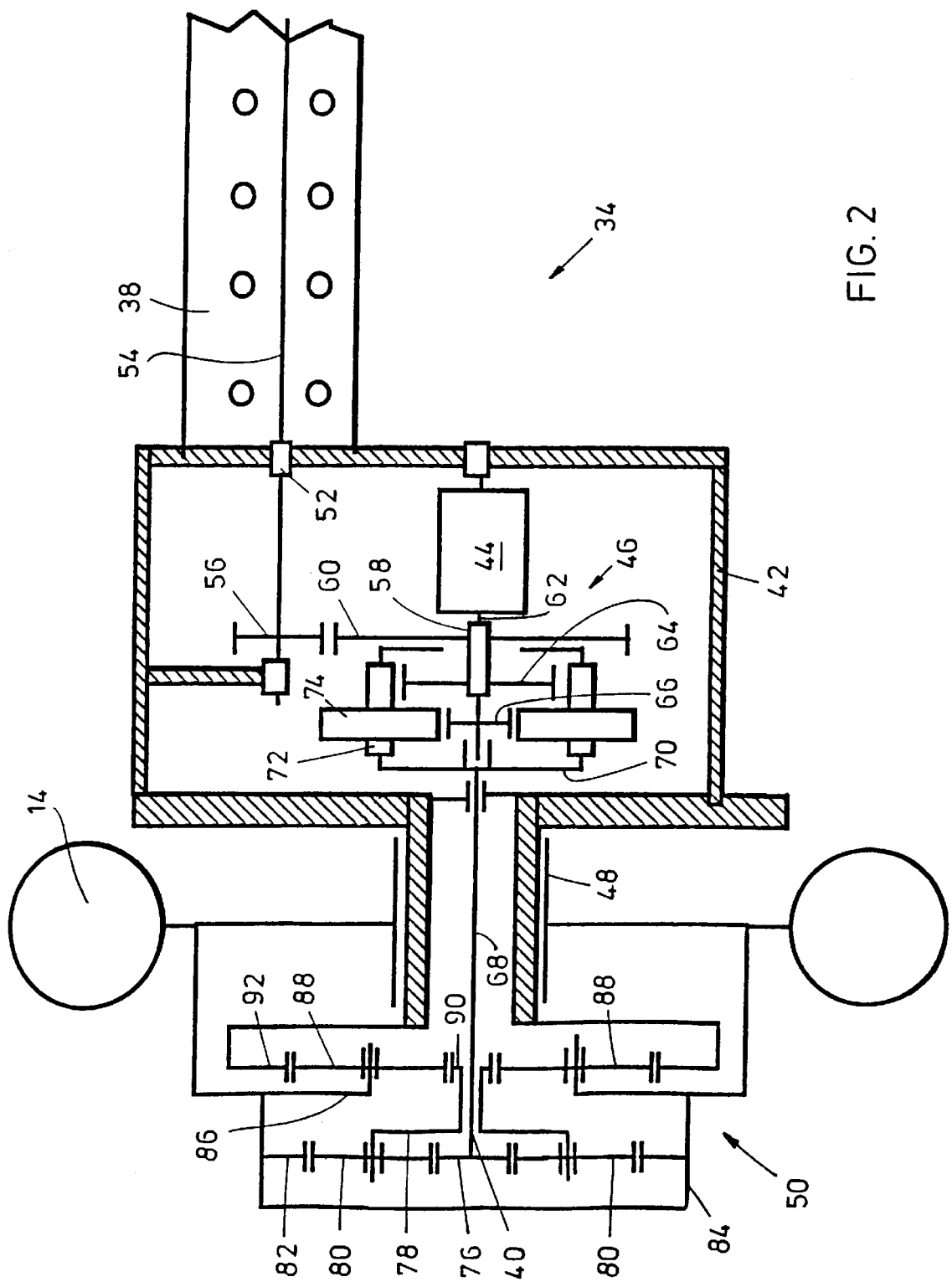
FIG. 2 is a schematic diagram of an individual wheel hybrid drive according to the invention.

An individual wheel hybrid drive for a rear wheel 14 of the rear axle 34 in accordance with the invention is shown in FIG. 2. The axle body 38 of the rear axle 34 engages with a final drive housing 42, radially offset from the wheel axis 40. Within the final drive housing 42 are an electric motor 44 and a summing gear 46 in the form of a Ravigneaux set. The rear wheel 14 is rotatably mounted on the final drive housing 42 by means of a wheel bearing 48 and is driven from the summing gear 46 via a final drive gearbox 50 formed as a planetary gear.

An input shaft 54 enters the final drive housing 42 through a bearing 52 and is driven mechanically by the internal combustion engine 16. A gearwheel 56 on the input shaft 54 meshes with a gearwheel 60 fixed on a hollow shaft 58. A first sun wheel 64 of the Ravigneaux set 46 is also mounted fast against rotation on the hollow shaft 58. The hollow shaft 58 is rotatably mounted on the output shaft 62 of the electric motor 44, which carries a second sun wheel 66 of the Ravigneaux set 46. The free end of the output shaft 62 is mounted in a planet carrier 70 supported by a coupling shaft 68. Sets of long planet wheels 72 and of short planet wheels 74 are arranged on the planet carrier 70. There can be planet wheel sets of three each for example, although only two are shown. The long planet wheels 72 mesh with the first, larger sun wheel 64 and the short planet wheels 74 mesh with the second, smaller sun wheel 66. Furthermore, each of the long planet wheels 72 meshes with an associated short planet wheel 74.

The summing gear 46 is preferably a planetary gear with a Ravigneaux set. The Ravigneaux set combines the torque introduced by the gearwheel 60 from the mechanical drive with the torque transmitted through the output shaft 62 of the electric motor 44, in accordance with the diameter ratio of the two sun wheels 64, 66. Preferably, the summing gear is designed to allow shifting between at least two speed transmission ratios.

The coupling shaft 68 serves as the input shaft for the final drive gearbox 50 and carries a sun wheel 76. A planet carrier 78 is rotatably mounted on the coupling shaft 68 with its planet wheels 80 in mesh with the sun wheel 76 and a ring gear 82. The ring gear 82 is arranged rotationally fast in a wheel bearing housing 84, which carries the rear wheel 14 fast against rotation. A further planet carrier 86 is arranged rotationally fast in the wheel bearing housing 84. The planet wheels 88 of the further planet carrier 86 mesh on the one hand with a sun wheel 90, which is non-rotatably coupled to the first-said planet carrier 78 and on the other hand with a ring gear 92, which is non-rotatably coupled to the stationary final drive housing 42. The speed of rotation transmitted from the coupling shaft 68 is greatly reduced by this planetary gear 50 and the torque transmitted to the rear wheel is correspondingly increased.

Figure 3:
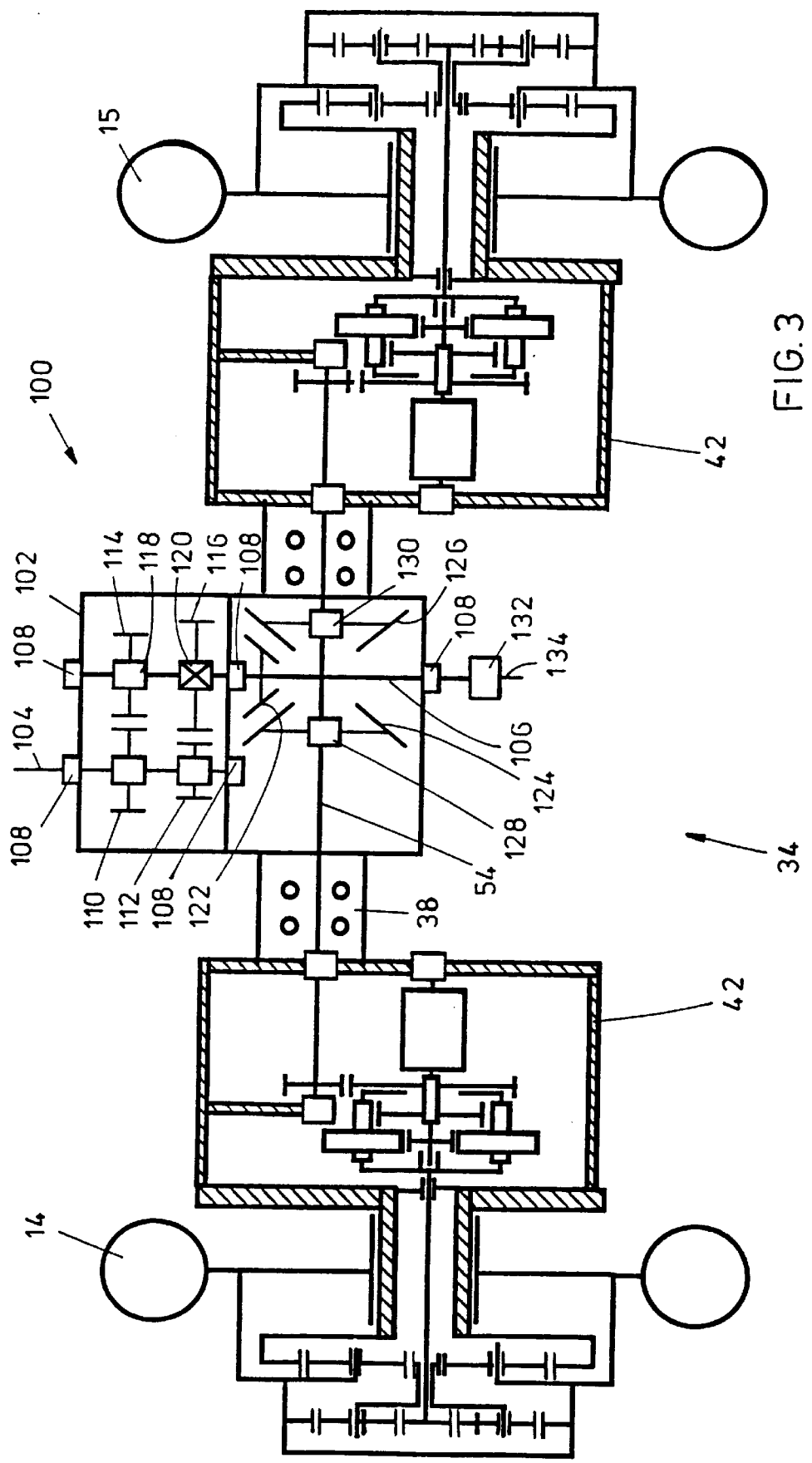
FIG. 3 is a schematic diagram of the drive concept according to the invention for a vehicle rear axle.

Referring now to FIG. 3, each of the hybrid individual wheel drives for the left wheel 14 and the right wheel 15 corresponds to the drive described with reference to FIG. 2. A change-speed gearbox 100 is arranged in the central region of the axle body 38 with an input shaft 104 in its gearbox housing 102 coupled to the rear drive shaft 28 shown in FIG. 1, and an output shaft 106 parallel to the input shaft 104, rotatably mounted by means of bearings 108. The input shaft 104 and the output shaft 106 each carry two gearwheels 110, 112, 114, 116 with different diameters. The gearwheels 110, 112 of the input shaft 104 are connected rotationally fast with this shaft, while the gearwheels 114, 116 of the output shaft can be selectively coupled fast against rotation therewith by means of clutches 118, 120. According to FIG. 3, the clutch 120 couples the gearwheel 116 fast to the output shaft 106, which is indicated by a cross. This design of the change-speed gearbox 100 facilitates switching the transmitted speeds of rotation and torques between two speed stages.

The output shaft 106 further carries a rotationally fast bevel gear 122, which meshes with two bevel gears 124, 126, which are arranged rotatably on the input shaft 54 of the final drive running transverse to the output shaft 106. The bevel gears 124 and 126 can be connected rotationally fast with the input shaft 54 by respective associated clutches 128, 130. By switching the clutches 128, 130 the input shaft 54 can thus be driven selectively in the forwards or reverse direction or be uncoupled from the mechanical drive train.

The output shaft 106 is further coupled to a PTO shaft clutch 132, through which a rear PTO shaft 134 can be selectively engaged or disengaged. The changespeed gearbox 100 can thus both transmit the mechanical torque for the hybrid drive of the two rear wheels 14, 15 and also the power for the rear PTO shaft 134. Thus, by the use of selective coupling means (not shown), the changespeed gearbox 100 can be used selectively for pure PTO drive (axle drive disconnected), for dual drive (driving the PTO shaft and the rear axle at the same time) and for pure rear wheel drive (PTO shaft disconnected). Furthermore, a front PTO shaft (not shown) can be mounted on the front frame. An engine driven Cardan shaft may be coupled to directly to the rear axle and then to the PTO shaft, via a changespeed gearbox. The change-speed gearbox 100 has at least 2 reduction ratios. Alternatively, it could provide 4 transmission ratios, for example, in order to facilitate different PTO shaft speeds of rotation, so that the rear PTO speed of rotation can be shifted between 540, 750, 1000 and 1250 rpm. The transmission 100 supplies mechanical power to both the rear axle and the PTO. When shifting the transmission both the PTO speed and the mechanical rear axle speed are changed commonly. Because the transmission is designed to supply PTO speeds of 540, 750, 1000 and 1250 RPM the same speed steps are avail axle. The full range of the PTO speeds is 1250:540. This is greater than 2:1. Therefore the range for the rear axle speeds is also greater than 2:1. When the PTO clutch 132 is disengaged the mechanical power of the change-speed gearbox is transmitted to the hybrid axle only. Therefore, in this condition the possible traveling drive power is higher than it was with PTO engagement. Because a mechanical power transmission has a higher efficiency than an electrical power transmission, the overall efficiency is higher without PTO than with PTO.

The mechanical drive makes available a base speed of rotation upon which may be superimposed an electricly controlled rotation speed. By controlling the electric motors, stepless adjustment of the speed of each wheel of the drive axle is possible. Each electric motor can be driven forwards or in reverse, so that the associated summing gear adds or subtracts the speed of rotation of the electric motor to or from the speed of rotation of the mechanical branch. The setting of the resultant vehicle speed is effected by adjusting, on the one hand the speed of rotation of the internal combustion engine as well as possibly the transmission ratio of a following change-speed gearbox, and on the other hand the speed of rotation of the electric motor as well as possibly the transmission ratio of the summing gear and/or of a further gear. This facilitates stepless control and adjustment of the speeds of rotation and/or torques of the individual wheels, i.e. it allows speeds of rotation to be set and adjusted accurately for each wheel. The drive system is preferably designed so that more mechanical power than electrical power is transmitted to the wheels in order to achieve a good overall efficiency.

It is also possible to dispense with an axle differential which provides compensation of the speeds of rotation of the wheels of an axle when travelling around a bend. The summing gear can be connected to the vehicle internal combustion engine directly, or if desired, via a change-speed gearbox. Since the speeds of rotation of all the electric individual wheel drives of front and rear axles are freely adjustable, good driving behavior and high flexibility in operation of the working or commercial vehicle result, especially when turning an agricultural tractor into the headland, holding to a track when plowing, swinging into narrow parking spaces, etc.

The electric motors have a stabilizing effect on the wheel speeds of rotation both when driving and when braking the wheels. The vehicle thus holds its track very well and can even be used as an unmanned robot which follows a predetermined route.

Purely electric individual wheel drives are advantageous for steering axles, since the expense of a mechanical drive for a steered axle is avoided. Preferably, the front axle is driven purely electrically and the rear axle is a parallel hybrid drive. Thus, the rear axle serves as the main drive axle and the less heavily loaded front axle serves as an auxiliary drive axle. Since a substantial proportion of power is applied mechanically through the rear axle, good efficiency results. Alternatively, the second drive axle can be driven solely mechanically, via an engine driven drive shaft and a change-speed gear. Alternatively, a vehicle could be provided with a plurality of hybrid axles, each of which is coupled to the internal combustion engine through a drive shaft.

Such a drive system is suitable for use with an electronic controller (not shown) which could process signals from steering angle sensors (not shown) for detecting the steering angle of the steered wheels as well as signals from wheel speed sensors (not shown). Such a controller could computes speed commands for each wheel from a predetermined set-point speed and the sensed rotation speed and from a computed set-point steering angle and the sensed steering angle, on the basis of which commands the electric motors and the driven wheels could be controlled. For example, in straight travel such a controller could drive the wheels at equal speeds, and could drive the wheels in accordance with the vehicle geometry and the steering angle when travelling round a bend, so that both wheels transfer equal forces to the ground (Ackermann condition, see for example EP-B 0 553 670).

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A vehicle drive system for a vehicle having an engine driven generator, a first drive axle with a pair of wheels, each wheel being driven by a respective electric motor powered by the generator, the drive system comprising:

a drive shaft driven by the engine and coupled to the first drive axle;

a pair of summing gears, each summing gear having an output shaft coupled to a respective wheel, each summing gear having a first input coupled to the drive shaft and a second input coupled to the respective electric motor; and a change-speed gearbox coupled between the engine and the summing gear and shiftable between at least two transmission ratios.

2. The drive system of claim 1, wherein: the summing gear is a planetary Ravigneaux type gear.

3. The drive system of claim 1, wherein: the summing gear is shiftable between at least two transmission ratios.

4. The drive system of claim 1, wherein: the electric motors are asynchronous motors.

5. A vehicle drive system for a vehicle having an engine driven generator, a first drive axle with a pair of wheels, each wheel being driven by a respective electric motor powered by the generator, the drive system comprising:

a drive shaft driven by the engine and coupled to the first drive axle;

a pair of summing gears, each summing gear having an output shaft coupled to a respective wheel, each summing gear having a first input coupled to the drive shaft and a second input coupled to the respective electric motor; and a final planetary speed reducing gear coupled to an output of the summing gear.

* * * * *